United States Patent
Liu

(10) Patent No.: US 12,408,130 B2
(45) Date of Patent: Sep. 2, 2025

(54) METHOD AND APPARATUS FOR DETERMINING OFFSET INDICATION, AND METHOD AND APPARATUS FOR DETERMINING OFFSET

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 404 days.

(21) Appl. No.: 18/014,015

(22) PCT Filed: Jul. 31, 2020

(86) PCT No.: PCT/CN2020/106353
§ 371 (c)(1),
(2) Date: Dec. 30, 2022

(87) PCT Pub. No.: WO2022/021387
PCT Pub. Date: Feb. 3, 2022

(65) Prior Publication Data
US 2023/0292269 A1    Sep. 14, 2023

(51) Int. Cl.
*H04W 56/00* (2009.01)
*H04L 5/00* (2006.01)

(52) U.S. Cl.
CPC ......... *H04W 56/003* (2013.01); *H04L 5/0048* (2013.01)

(58) Field of Classification Search
CPC .................. H04W 56/003; H04L 5/0048
See application file for complete search history.

(56) References Cited

U.S. PATENT DOCUMENTS

| 10,715,371 | B2 | 7/2020 | Si et al. |
| 2017/0359834 | A1* | 12/2017 | Wang ............... H04W 72/1273 |
| 2019/0223163 | A1 | 7/2019 | Ko et al. |
| 2019/0280843 | A1* | 9/2019 | Jeon ..................... H04L 5/0092 |
| 2019/0289530 | A1 | 9/2019 | Ko et al. |

(Continued)

FOREIGN PATENT DOCUMENTS

| CN | 109451797 A | 3/2019 |
| CN | 110034891 A | 7/2019 |

(Continued)

OTHER PUBLICATIONS

ISA State Intellectual Property Office of the People's Republic of China, International Search Report Issued in Application No. PCT/CN2020/106353, Apr. 26, 2021, WIPO, 6 pages.

(Continued)

*Primary Examiner* — Stephen J Clawson
(74) *Attorney, Agent, or Firm* — Volpe Koenig

(57) ABSTRACT

A method of determining an offset indication includes: determining an offset of remaining minimum system information (RMSI) with respect to a synchronization signal block (SSB); determining a target association relationship (Continued)

---

S101 — Determine an offset of remaining minimum system information (RMSI) with respect to a synchronization signal block (SSB)

S102 — Determine a target association relationship between a value of offset indication information $k_{ssb}$ and a number of corresponding offset resource elements (REs)

S103 — Determine a target $k_{ssb}$ based on the target association relationship and the offset between a value of offset indication information $k_{ssb}$ and a number of corresponding offset resource elements (REs); and determining a target $k_{ssb}$ based on the target association relationship and the offset.

18 Claims, 4 Drawing Sheets

(56) References Cited

U.S. PATENT DOCUMENTS

| | | | |
|---|---|---|---|
| 2019/0327767 A1 | 10/2019 | Islam et al. | |
| 2020/0084739 A1* | 3/2020 | Si | H04W 72/0453 |
| 2020/0154341 A1* | 5/2020 | Sun | H04W 72/23 |
| 2020/0260412 A1* | 8/2020 | Liu | H04L 5/0048 |
| 2020/0275445 A1* | 8/2020 | Liu | H04W 72/12 |
| 2020/0275451 A1 | 8/2020 | Liu | |
| 2020/0288465 A1* | 9/2020 | Sun | H04L 5/0094 |
| 2022/0321290 A1 | 10/2022 | Liu | |
| 2023/0092031 A1* | 3/2023 | Kim | H04L 1/0072 370/329 |
| 2023/0164714 A1* | 5/2023 | Kim | H04W 56/0015 |

FOREIGN PATENT DOCUMENTS

| | | |
|---|---|---|
| CN | 110521249 A | 11/2019 |
| CN | 110603852 A | 12/2019 |
| CN | 111316610 A | 6/2020 |
| EP | 3739797 A1 | 11/2020 |
| WO | 2018190678 A1 | 10/2018 |

OTHER PUBLICATIONS

State Intellectual Property Office of the People's Republic of China, Office Action and Search Report Issued in Application No. 2020800016906, Oct. 19, 2022, 12 pages. (Submitted with Machine/Partial Translation).

LG Electronics, "RMSI delivery and Coreset configuration", 3GPP TSG RAN WG1 Meeting #91, Reno, USA Nov. 27-Dec. 1, 2017, R1-1719894, Nov. 18, 2017, 16 pages.

Samsung, "Remaining Details on RMSI", 3GPP TSG RAN WG1#91, Reno, USA, Nov. 27-Dec. 1, 2017, R1-1720274, Nov. 18, 2017, 19 pages.

Qualcomm Incorporated, "Remaining details on NR-PBCH", 3GPP TSG RAN WG1 Meeting AH 1801, Vancouver, Canada, Jan. 22-26, 2018, R1-1800847, Jan. 13, 2018, 9 pages.

Duanfa Wu et al., "Research on 5G NR Cell Search Based on SSB", CNKI 5G Network Innovation Seminar Conference (2019), Aug. 15, 2019, 7 pages.

Ericsson, "Summary of 7.1.1.1 Synchronization signal", 3GPP TSG-RAN WG1#93, Busan, Korea, May 21-25, 2018, R1-1807862, May 29, 2018, 4 pages.

ZTE, "Maintenance for Downlink signals and channels", 3GPP TSG RAN WG1 Meeting #94, Gothenburg, Sweden, Aug. 20-24, 2018, R1-1808163, Aug. 10, 2018, 6 pages.

\* cited by examiner

METHOD AND APPARATUS FOR DETERMINING OFFSET INDICATION, AND METHOD AND APPARATUS FOR DETERMINING OFFSET

CROSS-REFERENCE TO RELATED APPLICATION

This application is the U.S. national phase application of International Application No. PCT/CN2020/106353, filed on Jul. 31, 2020, the disclosure of which is incorporated herein by reference in its entirety for all purposes.

TECHNICAL FIELD

The present disclosure relates to the field of communication technologies, and in particular, relates to methods of determining an offset indication, methods of determining an offset, apparatuses for determining an offset indication, apparatuses for determining an offset, electronic devices, and computer-readable storage media.

BACKGROUND

Offset indication information $k_{ssb}$ may be carried in a synchronization signal block (SSB, which is also known as synchronization signal and physical broadcast channel (PBCH) block) sent from a base station to a terminal. After receiving the SSB, the terminal can receive remaining minimum system information (RMSI) based on the $k_{ssb}$ and offsetToPointA.

The offsetToPointA indicates an offset of the RMSI with respect to the SSB in units of resource blocks (RB), and the $k_{ssb}$ indicates an offset of the RMSI with respect to the SSB in units of resource elements (REs, which are also known as resource particles). One RB includes 12 REs. For Frequency Range 2 (FR2), the value of the $k_{ssb}$ is in a range from 0 to 11; thus, 4 bits are configured in the SSB for indicating the $k_{ssb}$.

In the FR2, a subcarrier spacing (SCS) of the SSB is generally 120 KHz or 240 KHz, and the subcarrier spacing of the RMSI is generally 60 KHz or 120 KHz. As communication expands along with the frequency ranges, the communication frequency ranges are not limited to the FR2, but have been extended to FR2x (or FR3), which is generally considered as 52.6 GHz to 71 GHz. In order to meet the related requirements of such a high frequency range, the SCS in this frequency range also enlarges accordingly. The SCS of the RMSI may be greater than 120 KHz, for example, 240 KHz.

In the case where the SCS of the RMSI enlarges, the SCS corresponding to the REs of the RMSI is to be different from the SCS corresponding to the REs of the SSB, so that the offset of the RMSI with respect to the SSB in units of REs may exceed 11, which leads to a problem that the $k_{ssb}$ using 4 bits is insufficient to indicate the number of offset REs within a single RB.

SUMMARY

According to a first aspect of the present disclosure, a method of determining an offset indication is provided, which applies to a base station and includes: determining an offset of remaining minimum system information (RMSI) with respect to a synchronization signal block (SSB); determining a target association relationship between a value of offset indication information $k_{ssb}$ and a number of corresponding offset resource elements (REs); and determining a target $k_{ssb}$ based on the target association relationship and the offset.

According to a second aspect of the present disclosure, a method of determining an offset is provided, which applies to a terminal and includes: determining a target association relationship between a value of offset indication information $k_{ssb}$ and a number of corresponding offset resource elements (REs); and determining an offset of remaining minimum system information (RMSI) with respect to a synchronization signal block (SSB) based on a target $k_{ssb}$ that is received and the target association relationship.

BRIEF DESCRIPTION OF THE DRAWINGS

The drawings related to the description of the examples will be briefly introduced to explain the technical solutions provided by the examples of the present disclosure more clearly. The drawings in the following description illustrate only some examples of the present disclosure, and based on these drawings, those of ordinary skill in the art may obtain other drawings without creative work.

DETAILED DESCRIPTION OF THE EMBODIMENTS

The following, in conjunction with the drawings of the examples of the present disclosure, will clearly and completely describe the technical solutions provided in the examples of the present disclosure. The described examples are a part, but not all, of the examples of the present disclosure.

Based on the examples provided in the present disclosure, all other examples, which can be obtained by those of ordinary skill in the art without creative work, shall fall within the protection scope of this application.

The present disclosure provides methods of determining an offset indication, methods of determining an offset, apparatuses for determining an offset indication, apparatuses for determining an offset, electronic devices, and computer-readable storage media to solve technical problems in related technologies.

Figure 1:
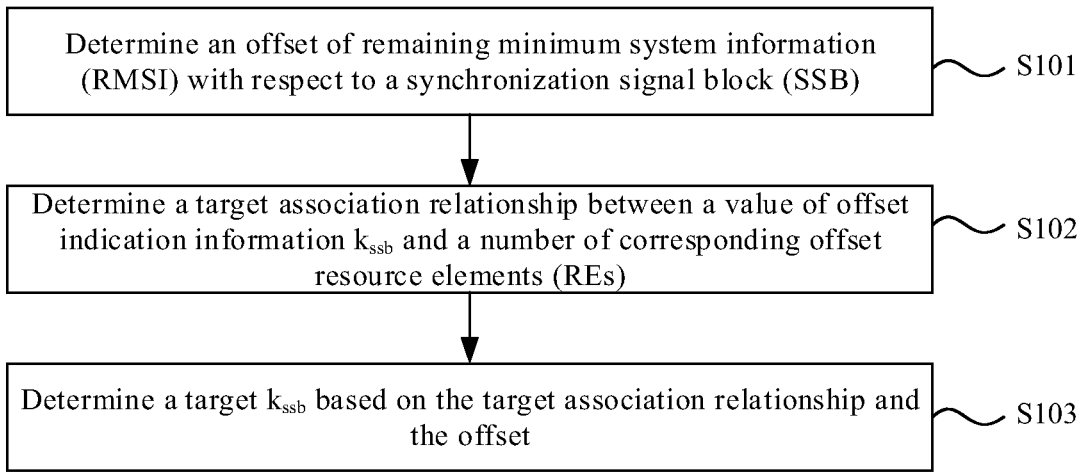
FIG. 1 illustrates a schematic flowchart of a method of determining an offset indication according to an example of the present disclosure.

FIG. 1 illustrates a schematic flowchart of a method of determining an offset indication according to an example of the present disclosure. The method in this example applies to a base station. The base station includes, but is not limited to, a 4G base station, a 5G base station, and a 6G base station. The base station may communicate with a terminal as user equipment. The terminal includes but is not limited to an electronic device, such as a mobile phone, a tablet computer, a wearable device, a sensor, and an Internet of Things (IoT) device.

As illustrated in FIG. 1, the method of determining an offset indication may include the following steps.

At step S101, an offset of remaining minimum system information (RMSI) with respect to a synchronization signal block (SSB) is determined.

At step S102, a target association relationship is determined between a value of offset indication information $k_{ssb}$ and a number of corresponding offset resource elements (REs). In one or more implementations, the target association relationship may be pre-stored by the base station, or be determined based on a subcarrier spacing (SCS) of the RMSI and the subcarrier spacing of the SSB, or be determined based on a predetermined value specified in a communication protocol. In one implementation, determining the target association relationship between the value of the offset indication information $k_{ssb}$ and the number of corresponding offset REs may include reading the pre-stored target association relationship from memory. In another implementation, determining the target association relationship between the value of offset indication information $k_{ssb}$ and the number of corresponding offset REs may include determining the target association relationship based on the subcarrier spacing of the RMSI and the subcarrier spacing of the SSB, or determining the target association relationship based on a predetermined value specified in the communication protocol.

At step S103, a target $k_{ssb}$ is determined based on the target association relationship and the offset.

In one example, before sending the SSB to the terminal, the base station may first determine the offset of the RMSI sent after the SSB with respect to the SSB. The offset includes two parts, the first one is an offset in units of resource blocks (RBs), which is, for example, known as offsetToPointA, and the second one is an offset in units of REs. Via these two parts, a specific position of the RMSI in the frequency domain relative to the SSB may be learned.

In related arts, since the frequency corresponding to Frequency Range 2 (FR2) is relatively low and is generally less than 52.6 GHz, the subcarrier spacing adopted is also relatively low, so that it doesn't occur that the SCS of the RMSI (also known as SubcarrierSpaceCommon) is larger than the SCS of the SSB. In the case where the SCS of the RMIS is less than or equal to the SCS of the SSB, the SCS corresponding to the REs of the RMSI is generally equal to the SCS corresponding to the REs of the SSB, so that the offset of the RMSI with respect to the SSB in units of REs, i.e., the second part of the offset, may be indicated by the $k_{ssb}$. The value of the $k_{ssb}$ is the number of offset REs of the RMSI with respect to the SSB in units of REs (the second part of the offset).

With the expansion of the frequency ranges, in an FR2x, the SCS of the RMSI is expected to enlarge following an increasing frequency, which is generally between 52.6 GHz and 70 GHz, for example, being greater than 240 KHz. Therefore, the SCS of the RMSI may be greater than the SCS of the SSB. In the case where the SCS of the RMSI is greater than the SCS of the SSB, the SCS corresponding to the REs of the RMSI is also greater than the SCS corresponding to the REs of the SSB. For example, the SCS of the SSB is 120 KHz, and the SCS of the RMSI is 240 KHz. Then, the number of offset REs of the RMSI with respect to the SSB in units of REs is to be greater than 12, for example, up to 24. In this case, the maximum possible number of offset REs cannot be indicated, since 4 bits can only indicate up to 16 following the indication scheme in the related arts and there are no extra bits in the SSB for indication.

According to the example of the present disclosure, the base station may predetermine or pre-store the target association relationship between the value of the offset indication information $k_{ssb}$ and the number of corresponding offset REs, that is, what number of REs correspond to the value of the $k_{ssb}$. Therefore, after determining the offset of the RMSI with respect to the SSB, the target $k_{ssb}$ can be determined based on the target association relationship and the offset.

The offset includes an offset in units of RBs offsetToPointA plus an offset in units of REs. Specifically, the target $k_{ssb}$ may be determined based on the offset in units of REs and the target association relationship.

For example, the offset in units of REs is 18 REs, the SCS of the RMSI is 480 KHz, the SCS of the SSB is 240 KHz, and the target association relationship is that when the SCS of the RMSI is greater than the SCS of the SSB, the ratio of the number of corresponding offset REs to the target $k_{ssb}$ is equal to a quotient of the subcarrier spacing of the RMSI divided by the subcarrier spacing of the SSB.

Thus, the number of offset REs corresponding to the target $k_{ssb}$ is 18, which is equal to (480 KHz/240 KHz) multiplied by the target $k_{ssb}$, that is, the target $k_{ssb}$=18/(480 KHz/240 KHz)=18/2=9. Therefore, the target $k_{ssb}$ can be indicated by 4 bits since 9 is less than 16.

For example, the offset in units of REs is 20 REs, the SCS of the RMSI is 480 KHz, the SCS of the SSB is 120 KHz, and the target association relationship is that when the SCS of the RMSI is greater than the SCS of the SSB, the ratio of the number of corresponding offset REs to the target $k_{ssb}$ is equal to the quotient of the subcarrier spacing of the RMSI divided by the subcarrier spacing of the SSB.

Thus, the number of offset REs corresponding to the target $k_{ssb}$ is 20, which is equal to (480 KHz/120 KHz) multiplied by the target $k_{ssb}$, that is, the target $k_{ssb}$=20/(480 KHz/120 KHz)=20/4=5. Therefore, the target $k_{ssb}$ can be indicated by 4 bits since 5 is less than 16.

Accordingly, according to the example of the present disclosure, even if the number of offset REs of the RMSI with respect to the SSB in units of REs is greater than 12, the $k_{ssb}$ can still be indicated by 4 bits in the SSB, so as to indicate a maximum possible number of offset REs without expanding the number of corresponding bits of the $k_{ssb}$.

Alternatively, or additionally, the method further includes:

sending the RMSI in accordance with the offset. The SSB carries the determined target $k_{ssb}$.

In one example, since the maximum possible number of offset REs can be indicated without expanding the number of corresponding bits of the $k_{ssb}$, an occupancy of the target $k_{ssb}$ to the SSB may be reduced when the determined target $k_{ssb}$ is sent to the terminal through the SSB to indicate the terminal the offset of the RMSI with respect to the SSB.

Alternatively, or additionally, a low bound of a subcarrier spacing candidate set of the RMSI is greater than or equal to 240 KHz.

In one example, either the SCS of the SSB or the SCS of the RMSI may be selected by the base station, rather than being fixed. Specifically, the base station may select one value from an SCS candidate set of SSB as the SCS of the SSB, and select one value from an SCS candidate set of RMSI as the SCS of the RMSI.

When the frequency corresponding to the frequency range increases, it is mainly expected to enlarge the SCS during sending data from the base station to the terminal, that is, the SCS of the RMSI. In the FR2 and the frequency range below the FR2 (e.g., FR1), the maximum value in the SCS candidate set of RMSI is 120 KHz. According to the example of the present disclosure, communication may be performed in the frequency range over FR2, and thus, the base station may send the RMSI in accordance with a larger SCS. Therefore, it may set the low bound of the SCS candidate set of RMSI greater than or equal to 240 KHz, so the base station may select the SCS greater than 120 KHz to send the RMSI to the terminal.

For example, the SCS candidate set of SSB is {120,240}, and the SCS candidate set of RMSI may be {240,480}. The unit of the values in the sets is KHz, and the number of elements in each set is not limited to two members, which may be set as required. For example, the SCS candidate set of RMSI may be {240, 480, 960}.

Alternatively, or additionally, the target association relationship includes:

in response to determining that the subcarrier spacing of the RMSI is greater than the subcarrier spacing of the SSB, the ratio of the number of corresponding offset REs to the value of the $k_{ssb}$ is equal to the quotient of the subcarrier spacing of the RMSI divided by the subcarrier spacing of the SSB.

Alternatively, or additionally, the target association relationship also includes:

in response to determining that the subcarrier spacing of the RMSI is less than or equal to the subcarrier spacing of the SSB, the ratio of the number of corresponding offset REs to the value of the $k_{ssb}$ is 1.

In one example, in the case where the subcarrier spacing of the RMSI is greater than the subcarrier spacing of the SSB, the SCS corresponding to the REs of the RMSI is greater than the SCS corresponding to the REs of the SSB. Therefore, the number of offset REs of the RMSI with respect to the SSB in units of REs is to be greater than 12, and the maximum possible number of offset REs cannot be indicated because 4 bits only indicate up to 16 when the ratio of the indicated number of REs to the value of the $k_{ssb}$ is 1:1. In this case, the target association relationship may be set as the ratio of the number of corresponding offset REs to the value of the $k_{ssb}$ being equal to the quotient of the subcarrier spacing of the RMSI divided by the subcarrier spacing of the SSB, so as to indicate the maximum possible number of offset REs without expanding the number of corresponding bits of the $k_{ssb}$.

In one example, for the case where the subcarrier spacing of the RMSI is less than or equal to the subcarrier spacing of the SSB, the SCS corresponding to the REs of the RMSI is generally equal to the SCS corresponding to the REs of the SSB. Therefore, it is feasible to indicate the offset of the RMSI with respect to the SSB in units of REs by the $k_{ssb}$. The value of the $k_{ssb}$ refers to the number of offset REs of the RMSI with respect to the SSB in units of REs. In this case, the target association relationship may be that the ratio of the number of corresponding offset REs to the value of the $k_{ssb}$ is 1, so that the base station may determine the target $k_{ssb}$ corresponding to the offset based on the fixed ratio of 1, which facilitates reducing the resource occupation in the base station.

In one example, after selecting a larger SCS for the RMSI, the base station may correspondingly select a larger SCS for the SSB, so as to ensure that the SCS of the RMSI is less than or equal to the SCS of the SSB.

For example, in the FR2, the SCS candidate set of SSB is {120, 240}, and the SCS candidate set of RMSI is {60, 120}.

According to the example of the present disclosure, the base station and the terminal may communicate with each other in the FR2x, and accordingly, the SCS of the RMSI can be enlarged. Specifically, the values in the SCS candidate set of RMSI may be enlarged. For example, the SCS candidate set of RMSI is {120,240}, and the SCS candidate set of SSB is {240,480}. As another example, the SCS candidate set of RMSI is {240,480}, and the SCS candidate set of SSB is {480,960}. Thus, it can be ensured that the SCS of the RMSI is less than or equal to the SCS of the SSB.

Alternatively, or additionally, the target association relationship is pre-stored in the terminal.

Alternatively, or additionally, the target association relationship is carried in the SSB, or carried in the information that the base station sends to the terminal before sending the SSB.

In one example, the target association relationship may be pre-stored by the terminal and the base station, for example, pre-specified according to a communication protocol between the terminal and the base station. The base station may also set the target association relationship, and then sent to the terminal by being carried in the SSB, or being carried in the information sent to the terminal before sending the SSB.

Figure 2:
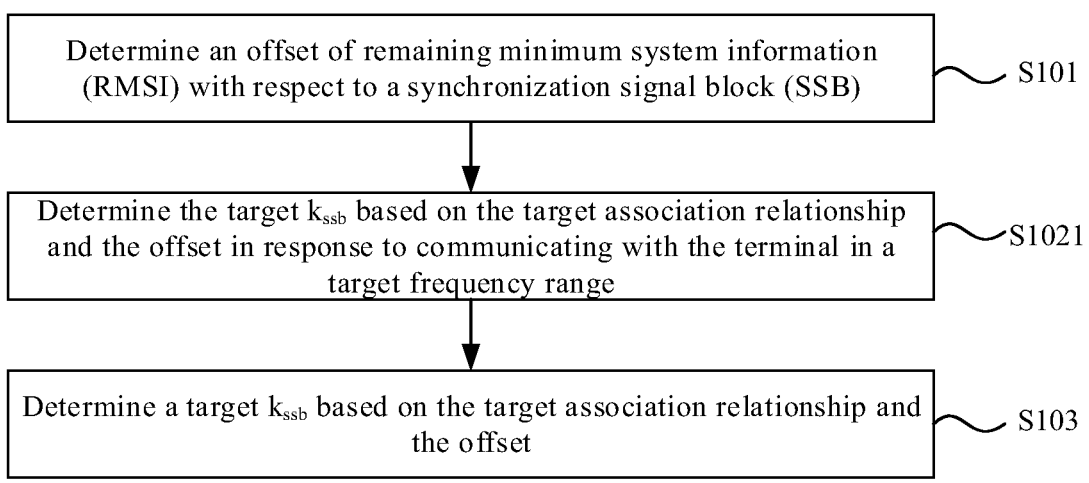
FIG. 2 illustrates a schematic flowchart of another method of determining an offset indication according to an example of the present disclosure.

FIG. 2 illustrates a schematic flowchart of another method of determining an offset indication according to an example of the present disclosure. As illustrated in FIG. 2, determining the target $k_{ssb}$ based on the offset and the target association relationship between the value of the offset indication information $k_{ssb}$ and the number of corresponding offset REs includes the following step.

At step S1021, the target $k_{ssb}$ is determined based on the target association relationship and the offset in response to communicating with the terminal in a target frequency range.

A lower bound of the target frequency range is greater than 52.6 GHz.

In one example, only when communicating with the terminal in the target frequency range, the base station determines the target $k_{ssb}$ based on the target association relationship between the value of the offset indication information $k_{ssb}$ and the REs and the offset, according to the example of the present disclosure. The target frequency range may refer to a frequency range with a higher frequency, for example, a frequency range whose low bound is greater than 52.6 GHz.

Since the technical problems in the related arts only occur when communicating in the frequency range with the higher frequency and thereafter the enlarged SCS is expected, in this example, the base station may determine the target $k_{ssb}$ based on the target association relationship between the value of the offset indication information $k_{ssb}$ and the number of corresponding REs and the offset only when communicating with the terminal in the target frequency range with the higher frequency.

When communicating with the terminal in another frequency range, for example, in the FR2, the base station may determine the target $k_{ssb}$ directly based on the number of REs in the offset without taking the association relationship into consideration, so as to simplify the operation complexity of the base station.

Figure 3:
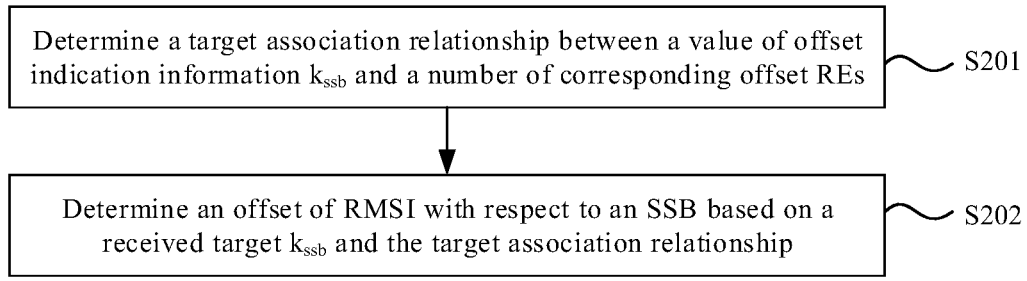
FIG. 3 illustrates a schematic flowchart of a method of determining an offset according to an example of the present disclosure.

FIG. 3 illustrates a schematic flowchart of a method of determining an offset according to an example of the present disclosure. The method illustrated in this example applies to a terminal. The terminal, as user equipment, may communicate with a base station. The base station includes, but is not limited to, a 4G base station, a 5G base station, and a 6G base station. The terminal includes, but is not limited to, an electronic device, such as a mobile phone, a tablet computer, a wearable device, a sensor, and an IoT device.

As illustrated in FIG. 3, the method of determining an offset may include the following steps.

At step S201, a target association relationship between a value of offset indication information $k_{ssb}$ and a number of corresponding offset REs is determined. In one implementation, the target association relationship may be pre-stored in the terminal, or may be instructed by the base station.

At step S202, an offset of RMSI with respect to an SSB is determined based on a received target $k_{ssb}$ and the target association relationship.

In one example, after receiving the SSB sent by the base station, the terminal may determine the offset of the RMSI with respect to the SSB based on the target $k_{ssb}$ carried by the SSB and the target association relationship between the value of the $k_{ssb}$ and the number of corresponding REs.

As described above, the offset includes two parts: the offset in units of RBs offsetToPointA, and the offset in units of REs. How to determine that the offsetToPointA doesn't belong to the improvements of the present disclosure, and may be determined based on the related technologies. The present disclosure focuses on determining the offset in units of REs.

For example, the offset in units of REs is 18 REs, a SCS of the RMSI is 480 KHz, the SCS of the SSB is 240 KHz, and the target association relationship is that when the SCS of the RMSI is greater than the SCS of the SSB, a ratio of a number of corresponding offset REs to the target $k_{ssb}$ is equal to a quotient of the subcarrier spacing of the RMSI divided by the subcarrier spacing of the SSB.

Thus, the number of offset REs corresponding to the target $k_{ssb}$ is 18, which is equal to (480 KHz/240 KHz) multiplied by the target $k_{ssb}$, that is, the target $k_{ssb}$=18/(480 KHz/240 KHz)=18/2=9. Therefore, the target $k_{ssb}$ can be indicated by 4 bits since 9 is less than 16.

For example, the offset in units of REs is 20 REs, the SCS of the RMSI is 480 KHz, the SCS of the SSB is 120 KHz, and the target association relationship is that when the SCS of the RMSI is greater than the SCS of the SSB, the ratio of the number of corresponding offset REs to the target $k_{ssb}$ is equal to the quotient of the subcarrier spacing of the RMSI divided by the subcarrier spacing of the SSB.

Thus, the number of offset REs corresponding to the target $k_{ssb}$ is 20, which is equal to (480 KHz/120 KHz) multiplied by the target $k_{ssb}$, that is, the target $k_{ssb}$=20/(480 KHz/120 KHz)=20/4=5. Therefore, the target $k_{ssb}$ can be indicated by 4 bits since 5 is less than 16.

Accordingly, according to the example of the present disclosure, even if the number of offset REs of the RMSI with respect to the SSB in units of REs is greater than 12, the $k_{ssb}$ can still be indicated by 4 bits in the SSB, so as to indicate a maximum possible number of offset REs without expanding the number of corresponding bits of the $k_{ssb}$.

Alternatively, or additionally, a low bound of a subcarrier spacing candidate set of the RMSI is greater than or equal to 240 KHz.

In one example, either the SCS of the SSB or the SCS of the RMSI may be selected by the base station, rather than being fixed. Specifically, the base station may select one value from an SCS candidate set of SSB as the SCS of the SSB, and select one value from an SCS candidate set of RMSI as the SCS of the RMSI.

When the frequency corresponding to the frequency range increases, it is mainly expected to enlarge the SCS during sending data from the base station to the terminal, that is, the SCS of the RMSI. In the FR2 and the frequency range below the FR2 (e.g., FR1), the maximum value in the SCS candidate set of RMSI is 120 KHz. According to the example of the present disclosure, communication may be performed in the frequency range over FR2, and thus, the base station may send the RMSI in accordance with a larger SCS. Therefore, it may set the low bound of the SCS candidate set of RMSI greater than or equal to 240 KHz, so that the base station may select the SCS greater than 120 KHz to send the RMSI to the terminal.

For example, the SCS candidate set of SSB is {120,240}, and the SCS candidate set of RMSI may be {240,480}. The unit of the values in the sets is KHz, and the number of elements in each set is not limited to two members, which may be set as required. For example, the SCS candidate set of RMSI may be {240, 480, 960}.

Alternatively, or additionally, the target $k_{ssb}$ is received through the SSB; and the method further includes:

receiving the RMSI based on the offset and the SSB.

In one example, after receiving the SSB, the terminal may determine the offset of the RMSI with respect to the SSB based on the $k_{ssb}$ in the SSB, then determine a position of the RMSI in frequency domain based on the offset and the position of the SSB in frequency domain position, and then receive the RMSI at the determined position in frequency domain.

Alternatively, or additionally, the target association relationship includes that:

in response to determining that the subcarrier spacing of the RMSI is greater than the subcarrier spacing of the SSB, the ratio of the number of corresponding offset REs to the value of the $k_{ssb}$ is equal to the quotient of the subcarrier spacing of the RMSI divided by the subcarrier spacing of the SSB.

Alternatively, or additionally, the target association relationship also includes that:

in response to determining that the subcarrier spacing of the RMSI is less than or equal to the subcarrier spacing of the SSB, the ratio of the number of corresponding offset REs to the value of the $k_{ssb}$ is 1.

In one example, in the case where the subcarrier spacing of the RMSI is greater than the subcarrier spacing of the SSB, the SCS corresponding to the REs of the RMSI is greater than the SCS corresponding to the REs of the SSB. Therefore, the number of offset REs of the RMSI with respect to the SSB in units of REs is to be greater than 12, and the maximum possible number of offset REs cannot be indicated because 4 bits only indicate up to 16 when the ratio of the indicated number of REs to the value of the $k_{ssb}$ is 1:1. In this case, the target association relationship may be set as the ratio of the number of corresponding offset REs to the value of the $k_{ssb}$ being equal to the quotient of the subcarrier spacing of the RMSI divided by the subcarrier spacing of the SSB, so as to indicate the maximum possible number of offset REs without expanding the number of corresponding bits of the $k_{ssb}$.

In one example, for the case where the subcarrier spacing of the RMSI is less than or equal to the subcarrier spacing of the SSB, the SCS corresponding to the REs of the RMSI is generally equal to the SCS corresponding to the REs of the SSB. Therefore, it is feasible to indicate the offset of the RMSI with respect to the SSB in units of REs by the $k_{ssb}$. The value of the $k_{ssb}$ refers to the number of offset REs of the RMSI with respect to the SSB in units of REs. In this case, the target association relationship may be that the ratio of the number of corresponding offset REs to the value of the $k_{ssb}$ is 1, so that the base station doesn't need to calculate the ratio of the SCS of the RMSI to the SCS of the SSB, which facilitates reducing the resource occupancy in the base station.

In one example, after selecting a larger SCS for the RMSI, the base station may correspondingly select a larger SCS for the SSB, so as to ensure that the SCS of the RMSI is less than or equal to the SCS of the SSB.

For example, in the FR2, the SCS candidate set of SSB is {120, 240}, and the SCS candidate set of RMSI is {60, 120}.

According to the example of the present disclosure, the base station and the terminal may communicate with each other in the FR2x, and accordingly, the SCS of the RMSI can be enlarged. Specifically, the values in the SCS candidate set of RMSI may be enlarged. For example, the SCS candidate set of RMSI is {120,240}, and the SCS candidate set of SSB is {240,480}. As another example, the SCS candidate set of RMSI is {240,480}, and the SCS candidate set of SSB is {480,960}. Thus, it can be ensured that the SCS of the RMSI is less than or equal to the SCS of the SSB.

Alternatively, or additionally, the target association relationship is pre-stored in the terminal.

Figure 4:
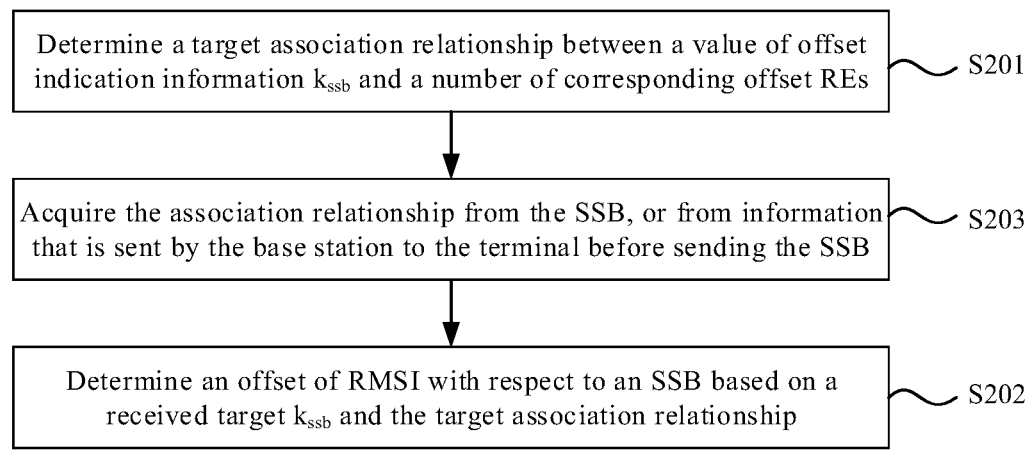
FIG. 4 illustrates a schematic flowchart of another method of determining an offset according to an example of the present disclosure.

FIG. 4 illustrates a schematic flowchart of another method of determining an offset according to an example of the present disclosure. As illustrated in FIG. 4, the method further includes the following step.

At step S203, the target association relationship is acquired from the SSB, or from information that the base station sends to the terminal before sending the SSB.

In one example, the target association relationship may be pre-stored by the terminal and the base station, for example, pre-specified according to a communication protocol between the terminal and the base station. The target association relationship may also be set by the base station, and then sent to the terminal by being carried in the SSB, or being carried in the information sent to the terminal before sending the SSB.

Corresponding to the aforementioned examples of the methods of determining an offset indication and the methods of determining an offset, the present disclosure also provides examples of apparatuses for determining an offset indication and apparatuses for determining an offset.

Figure 5:
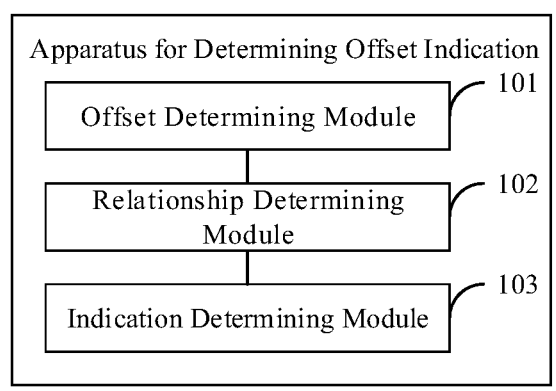
FIG. 5 illustrates a schematic block diagram of an apparatus for determining an offset indication according to an example of the present disclosure.

FIG. 5 illustrates a schematic block diagram of an apparatus for determining an offset indication according to an example of the present disclosure. The apparatus illustrated in this example applies to a base station. The base station includes, but is not limited to, a 4G base station, a 5G base station, and a 6G base station. The base station may communicate with a terminal as user equipment. The terminal includes but is not limited to an electronic device, such as a mobile phone, a tablet computer, a wearable device, a sensor, and an IoT device.

As illustrated in FIG. 5, the apparatus for determining an offset indication may include:
- an offset determining module 101 that is configured to determine an offset of RMSI with respect to an SSB;
- a relationship determining module 102 that is configured to determine a target association relationship between a value of offset indication information $k_{ssb}$ and a number of corresponding offset REs; and
- an indication determining module 103 that is configured to determine a target $k_{ssb}$ based on the target association relationship and the offset.

Alternatively, or additionally, the apparatus further includes:
- a sending module that is configured to send the RMSI in accordance with the offset. The SSB carries the determined target $k_{ssb}$.

Alternatively, or additionally, the target association relationship includes:
- in response to determining that a subcarrier spacing of the RMSI is greater than a subcarrier spacing of the SSB, a ratio of the number of corresponding offset REs to the value of the $k_{ssb}$ is equal to a quotient of the subcarrier spacing of the RMSI divided by the subcarrier spacing of the SSB.

Alternatively, or additionally, the target association relationship also includes:
- in response to determining that the subcarrier spacing of the RMSI is less than or equal to the subcarrier spacing of the SSB, the ratio of the number of corresponding offset REs to the value of the $k_{ssb}$ is 1.

Alternatively, or additionally, a low bound of a subcarrier spacing candidate set of the RMSI is greater than or equal to 240 KHz.

Alternatively, or additionally, the target association relationship is pre-stored in the terminal.

Alternatively, or additionally, the target association relationship is carried in the SSB, or carried in information that the base station sends to the terminal before sending the SSB.

Alternatively, or additionally, the indication determining module is configured to determine, in response to communicating with the terminal in a target frequency range, the target $k_{ssb}$ based on the target association relationship and the offset, in which a low bound of the target frequency range is greater than 52.6 GHz.

Figure 6:
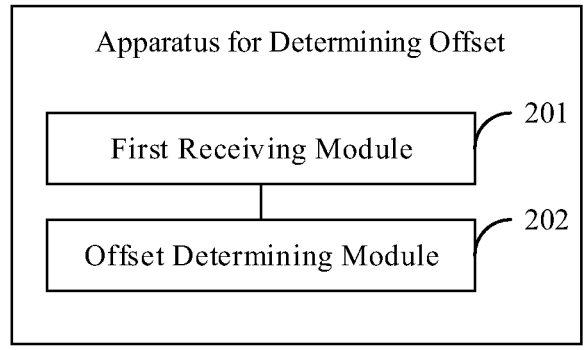
FIG. 6 illustrates a schematic block diagram of an apparatus for determining an offset according to an example of the present disclosure.

FIG. 6 illustrates a schematic block diagram of an apparatus for determining an offset according to an example of the present disclosure. The apparatus illustrated in this example applies to a terminal. The terminal, as user equipment, may communicate with a base station. The base station includes, but is not limited to, a 4G base station, a 5G base station, and a 6G base station.

The terminal includes, but is not limited to, an electronic device, such as a mobile phone, a tablet computer, a wearable device, a sensor, and an IoT device.

As illustrated in FIG. 6, the apparatus for determining an offset includes:
- a first receiving module 201 that is configured to determine a target association relationship between a value of offset indication information $k_{ssb}$ and a number of corresponding offset REs; and
- an offset determining module 202 that is configured to determine an offset of RMSI with respect to an SSB based on a received target $k_{ssb}$ and the target association relationship.

Alternatively, or additionally, the target $k_{ssb}$ is received through the SSB; and the apparatus further includes:
- a second receiving module that is configured to receive the RMSI based on the offset and the SSB.

Alternatively, or additionally, the target association relationship includes:
- in response to determining that a subcarrier spacing of the RMSI is greater than the subcarrier spacing of the SSB, a ratio of the number of corresponding offset REs to the value of the $k_{ssb}$ is equal to a quotient of the subcarrier spacing of the RMSI divided by the subcarrier spacing of the SSB.

Alternatively, or additionally, the target association relationship also includes:

in response to determining that the subcarrier spacing of the RMSI is less than or equal to the subcarrier spacing of the SSB, the ratio of the number of corresponding offset REs to the value of the $k_{ssb}$ is 1.

Alternatively, or additionally, a low bound of a subcarrier spacing candidate set of the RMSI is greater than or equal to 240 KHz.

Alternatively, or additionally, the target association relationship is pre-stored in the terminal.

Alternatively, or additionally, the apparatus further includes:

a relation acquiring module that is configured to acquire the association relationship from the SSB, or from information that the base station sends to the terminal before sending the SSB.

Regarding the apparatus in the foregoing examples, the specific manner in which each module performs its operation has been described in detail in the examples of the related methods, and will not be repeated here.

Since the apparatus examples correspond to the method examples, reference may be made to describing related parts of the method examples. The apparatus examples described above are merely illustrative, in which the modules described as separate components may or may not be physically separated, and the components displayed as modules may or may not be physical units, that is, may be located in one place or distributed to multiple units in a network. Some or all of the modules may be selected according to actual needs to achieve the objectives of the implementations of the examples. It can be understood and implemented by those of ordinary skill in the art without any creative effort.

An example of the present disclosure also provides an electronic device, including:

one or more processors; and a memory for storing instructions executable by the one or more processors.

The one or more processors are configured to implement the method of determining an offset indication described in any of the above examples, and/or the method of determining an offset described in any of the above examples.

According to an example of the present disclosure, a computer-readable storage medium storing a computer program is provided. The program, when executed by one or more processors, implements the steps in the method of determining an offset indication described in any of the above examples, and/or the steps in the method of determining an offset described in any of the above examples.

Figure 7:
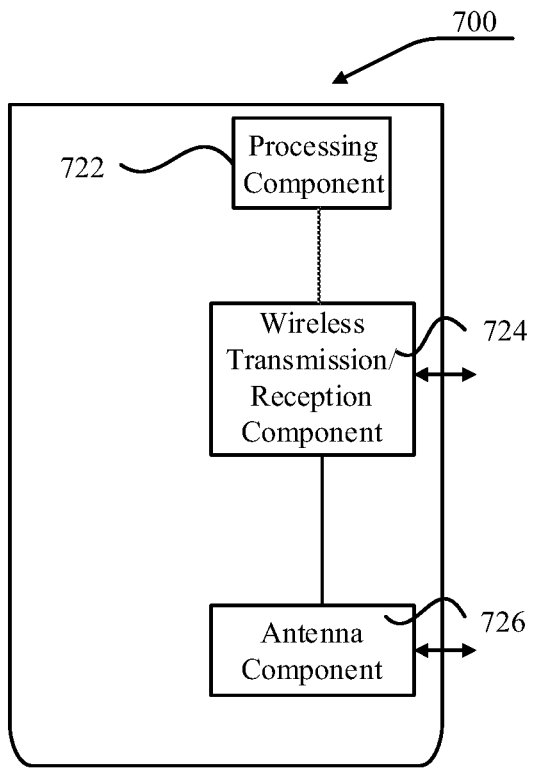
FIG. 7 illustrates a schematic block diagram of an apparatus for an offset indication according to an example of the present disclosure.

FIG. 7 illustrates a schematic block diagram of an apparatus 700 for an offset indication according to an example of the present disclosure. The apparatus 700 may be provided as a base station. As illustrated in FIG. 7, the apparatus 700 includes a processing component 722, a wireless transmission/reception component 724, an antenna component 726, and a signal processing part peculiar to the wireless interface. The processing component 722 may further include one or more processors. One processor of the processing component 722 may be configured to implement the method of determining an offset indication described in any of the foregoing examples.

Figure 8:
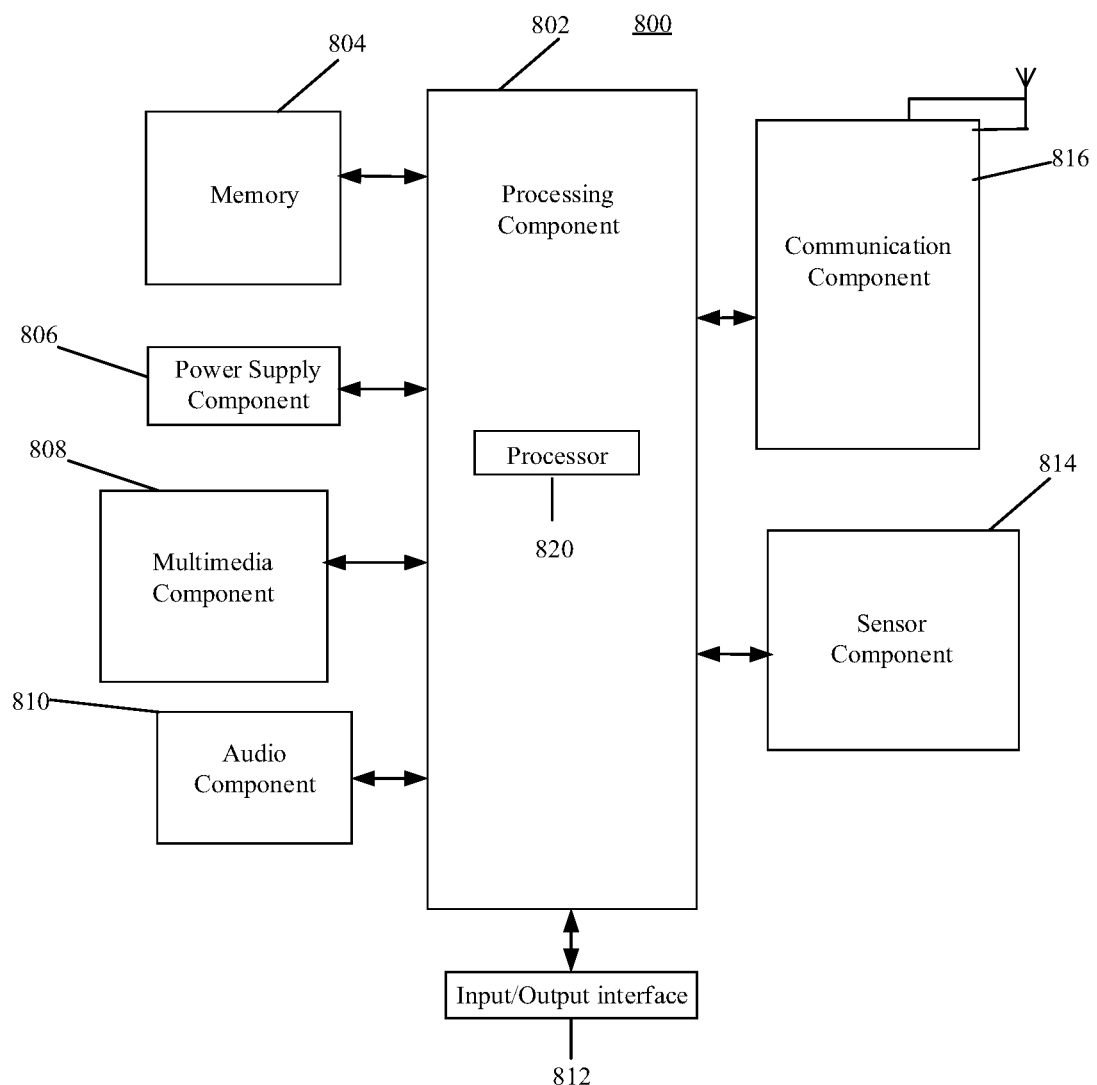
FIG. 8 illustrates a schematic block diagram of an apparatus for determining an offset according to an example of the present disclosure.

FIG. 8 illustrates a schematic block diagram illustrating an apparatus 800 for determining an offset according to an example of the present disclosure. For example, the apparatus 800 may be a mobile phone, a computer, a digital broadcasting terminal, a messaging device, a game console, a tablet device, a medical device, a fitness device, a personal digital assistant, and the like.

As illustrated in FIG. 8, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the apparatus 800, such as operations associated with display, phone calls, data communications, camera operations, and recording operations. The processing component 802 may include one or more processors 820 to execute instructions to complete all or part of the steps of the above methods of determining an offset. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operations of the apparatus 800. Examples of such data include instructions for any application or method operated on the apparatus 800, contact data, phonebook data, messages, pictures, videos, etc. The memory 804 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power supply component 806 provides power to various components of the apparatus 800. The power supply component 806 may include a power management system, one or more power supplies, and other components associated with generating, managing, and distributing power for the apparatus 800.

The multimedia component 808 includes a screen providing an output interface between the apparatus 800 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 808 includes a front camera and/or a rear camera. The front camera and/or rear camera may receive external multimedia data when the apparatus 800 is in an operating mode, such as a photographing mode or a video mode. Each front camera and rear camera may be a fixed optical lens system or have a focal length and optical zooming capability.

The audio component 810 is configured to output and/or input an audio signal. For example, the audio component 810 includes a microphone (MIC) that is configured to receive an external audio signal when the apparatus 800 is in an operating mode, such as a call mode, a recording mode, and a voice recognition mode. The received audio signal may be stored in the memory 804 or sent via the communication component 816. In some examples, the audio component 810 also includes a speaker for outputting an audio signal.

The I/O interface 812 provides an interface between the processing component 802 and a peripheral interface module. The above peripheral interface module may be a keyboard, a click wheel, buttons, or the like. These buttons may include, but are not limited to, a home button, a volume button, a start button, and a lock button.

The sensor component 814 includes one or more sensors to provide the apparatus 800 with status assessments in various aspects. For example, the sensor component 814 may detect an open/closed state of the apparatus 800 and a relative positioning of components such as the display and keypad of the apparatus 800, and the sensor component 814 can also detect a change in position of the apparatus 800 or a component of the apparatus 800, the presence or absence of user contact with the apparatus 800, orientation or acceleration/deceleration of the apparatus 800, and temperature change of the apparatus 800. The sensor component 814 may include a proximity sensor configured to detect the presence of a nearby object without any physical contact. The sensor component 814 may include an optical sensor, such as a complementary metal-oxide-semiconductor (CMOS) or charged coupled device (CCD) image sensor used in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the apparatus 800 and other devices. The apparatus 800 may access a wireless network based on any communication standard, such as WiFi, 2G, 3G, 4G LTE, 5G NR, or a combination thereof. In an example, the communication component 816 receives broadcast signals or broadcast related information from an external broadcast management system via a broadcast channel. In an example, the communication component 816 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology, and other technologies.

In one or more examples, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above methods of determining an offset.

In one or more examples, a non-transitory computer-readable storage medium is also provided, including instructions, such as the memory 804, including instructions. The above instructions may be executed by the one or more processors 820 of the apparatus 800 to complete the above methods of determining an offset. For example, the non-transitory computer-readable storage medium may be a read only memory (ROM), a random access memory (RAM), a CD-ROM, a magnetic tape, a floppy disk, an optical data storage device, and the like.

According to the examples of the present disclosure, a base station may predetermine or pre-store a target association relationship between a value of offset indication information $k_{ssb}$ and a number of REs, that is, what number of REs correspond to the value of $k_{ssb}$. Therefore, after determining an offset of RMSI with respect to the SSB, a target $k_{ssb}$ can be determined based on the target association relationship and the offset. Even if the number of offset REs of the RMSI with respect to the SSB in units of REs is greater than 12, the $k_{ssb}$ can still be indicated by 4 bits in the SSB, so as to indicate a maximum possible number of offset REs without expanding the number of corresponding bits of the $k_{ssb}$.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures shown in the drawings, and various modifications and changes can be made to the present disclosure without departing from the scope thereof.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the element.

The methods and apparatuses provided by the examples of the present disclosure are described in detail above. Specific examples are used in this disclosure to illustrate the principle and the implementations of the present disclosure. The description of the above examples is only used to help understand the methods and its core idea of the present disclosure. Moreover, those skilled in the art can change both the specific implementations and the application scope according to the idea of the present disclosure. In summary, the content of this specification should not be construed as a limitation to the present disclosure.

The invention claimed is:

1. A method of determining an offset indication, performed by a base station, comprising:
   determining an offset of remaining minimum system information (RMSI) with respect to a synchronization signal block (SSB);
   determining a target association relationship between a value of offset indication information $k_{ssb}$ and a number of corresponding offset resource elements (REs), wherein the target association relationship comprises:
      in response to determining that a subcarrier spacing of the RMSI is greater than a subcarrier spacing of the SSB, a ratio of the number of corresponding offset REs to the value of the offset indication information $k_{ssb}$ is equal to a quotient of the subcarrier spacing of the RMSI divided by the subcarrier spacing of the SSB; and determining a target $k_{ssb}$ based on the target association relationship and the offset.

2. The method according to claim 1, further comprising:
sending the SSB, wherein the SSB carries the target $k_{ssb}$ that is determined; and
sending the RMSI in accordance with the offset.

3. The method according to claim 1, wherein the target association relationship further comprises:
in response to determining that the subcarrier spacing of the RMSI is less than or equal to the subcarrier spacing of the SSB, a ratio of the number of corresponding offset REs to the value of the $k_{ssb}$ is 1.

4. The method according to claim 1, wherein a low bound of a subcarrier spacing candidate set of the RMSI is greater than or equal to 240 KHz.

5. The method according to claim 1, wherein the target association relationship is pre-stored the base station.

6. The method according to claim 1, wherein the target association relationship is carried in the SSB, or carried in information that is sent by the base station to a terminal before sending the SSB.

7. The method according to claim 1, wherein determining the target $k_{ssb}$ based on the target association relationship and the offset comprises:
determining, in response to communicating with a terminal in a target frequency range, the target $k_{ssb}$ based on the target association relationship and the offset.

8. The method according to claim 7, wherein a low bound of the target frequency range is greater than 52.6 GHz.

9. A method of determining an offset, performed by a terminal, comprising:
determining a target association relationship between a value of offset indication information $k_{ssb}$ and a number of corresponding offset resource elements (REs), wherein the target association relationship comprises:
in response to determining that a subcarrier spacing of remaining minimum system information (RMSI) is greater than a subcarrier spacing of a synchronization signal block (SSB), a ratio of the number of corresponding offset REs to the value of the offset indication information $k_{ssb}$ is equal to a quotient of the subcarrier spacing of the RMSI divided by the subcarrier spacing of the SSB; and determining an offset of the RMSI with respect to the SSB based on a target $k_{ssb}$ that is received and the target association relationship.

10. The method according to claim 9, further comprises:
receiving the SSB, wherein the target $k_{ssb}$ is carried by the SSB; and
receiving the RMSI based on the offset and the SSB.

11. The method according to claim 9, wherein the target association relationship further comprises:
in response to determining that the subcarrier spacing of the RMSI is less than or equal to the subcarrier spacing of the SSB, a ratio of the number of corresponding offset REs to the value of the $k_{ssb}$ is 1.

12. The method according to claim 9, wherein a low bound of a subcarrier spacing candidate set of the RMSI is greater than or equal to 240 KHz.

13. The method according to claim 9, wherein the target association relationship is pre-stored in the terminal.

14. The method according to claim 9, comprising:
acquiring the target association relationship from the SSB, or from information that is sent by a base station to the terminal before sending the SSB.

15. An electronic device, comprising:
one or more processors; and
a memory for storing instructions executable by the one or more processors;
wherein the one or more processors are configured to implement the method of determining an offset indication according to claim 1.

16. A non-transitory computer-readable storage medium storing a computer program thereon, wherein the computer program, when executed by one or more processors, implements the method of determining an offset indication according to claim 1.

17. An electronic device, comprising:
one or more processors; and
a memory for storing instructions executable by the one or more processors;
wherein the one or more processors are configured to implement the method of determining an offset according to claim 9.

18. A non-transitory computer-readable storage medium storing a computer program thereon, wherein the program, when executed by one or more processors, implements the method of determining an offset according to claim 9.

* * * * *